July 25, 1967 R. J. HOLTON 3,332,712
FASTENER MEANS
Original Filed June 13, 1961

INVENTOR.

BY ROBERT J. HOLTON

Teare, Fetzer & Teare
ATTORNEYS

United States Patent Office

3,332,712
Patented July 25, 1967

1

3,332,712
FASTENER MEANS
Robert J. Holton, Rocky River, Ohio, assignor to Tinnerman Products, Inc., Cleveland, Ohio, a corporation of Ohio
Original application June 13, 1961, Ser. No. 116,786, now Patent No. 3,190,167. Divided and this application Nov. 12, 1964, Ser. No. 410,371
9 Claims. (Cl. 287—189.36)

This application is a divisional application of the pending United States patent application of Robert J. Holton, Serial No. 116,786, filed June 13, 1961, now Patent No. 3,190,167.

This invention relates in general to fastener means, and more particularly to rotary fasteners adapted to be made from a single piece of metal stock or the like, and operative to be quickly attached to and detached from an apertured supporting panel or part in response to partial rotation of the fastener.

Rotary-type fasteners are known in the fastener art, but generally these fasteners are unduly expensive and/or are somewhat difficult to attach in operative position in the receiving aperture of the supporting panel, especially if such apertures are not produced to exact tolerances, and vary somewhat in size.

An object of the present invention is to provide a quickly operable rotary-type fastener which may be conveniently and readily actuated into holding position on an apertured supporting panel or part.

Another object of the invention is to provide a fastener of the above type which includes a generally flattened head portion, and a shank portion adapted for passage into a receiving aperture in a supporting part or panel, and wherein the shank includes means thereon for facilitating the shank's movement into the aperture irrespective of tolerance variations in the aperture size.

Another object of the invention is to provide a fastener of the above type which may be inexpensively produced from flat metal stock such as sheet metal, to provide an economically desirable arrangement.

A more specific object of the invention is to provide a rotary-type fastener produced from flat sheet metal stock and formed into a generally flattened, elongated head portion and a depending shank portion, with the shank portion having upwardly extending, flexible wing portions thereon for rotative engagement with the underside of an apertured support panel, and wherein the split shank provides lateral resiliency to the shank for ready insertion into an under sized receiving aperture in the supporting panel.

Other objects and advantages of the invention will be apparent from the following description taken in conjunction with the accompanying drawings wherein.

2

Figures 1, 2:
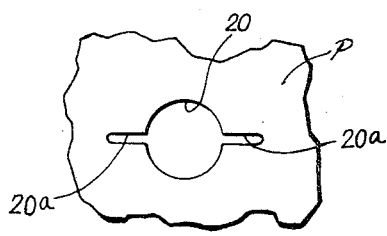
FIG. 1 is an elevational view taken from one side of a rotary fastener constructed in accordance with the instant invention.
FIG. 2 is an end elevational view taken generally from the right hand end of FIG. 1.
Figure 3:
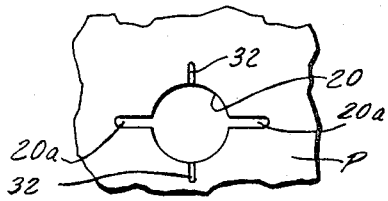
FIG. 3 is a top plan view of the fastener of FIGS. 1 and 2.
Figure 5:
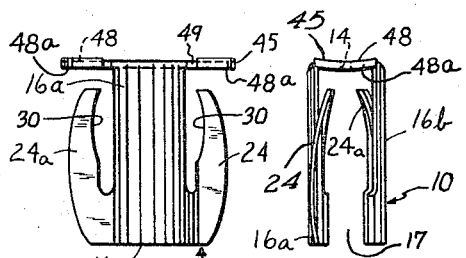
FIG. 5 is a fragmentary plan view of a work panel or part provided with an aperture adapted to accommodate the fastener of the present invention.
Figure 6:
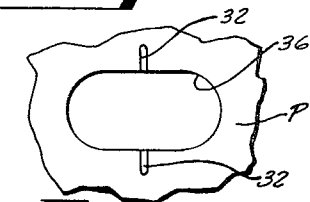
FIG. 6 is a fragmentary plan view taken from the other side of the work panel of FIG. 5, and illustrating in particular indentations formed in the work panel for receiving therein the upper ends of the resilient wings of the rotary fastener, to aid in retaining the latter in mounted position on the supporting panel.
Figure 8:
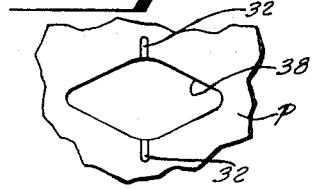
Figure 9:
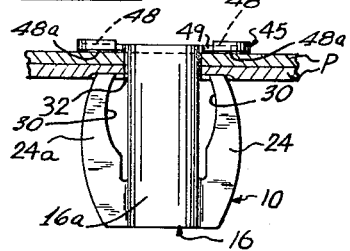
Figure 7:
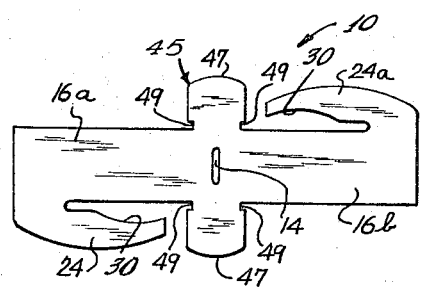

FIG. 7 is a sectional view showing a fastener of the FIG. 1 to 3 type mounted on a pair of juxtaposed apertured panels, and holding the latter together;

FIG. 8 is a fragmentary plan view generally similar to FIG. 5 and showing a modified form of aperture in a support panel;

FIG. 9 is a fragmentary plan view of a further modified form of aperture in a supporting panel.

Figure 4:
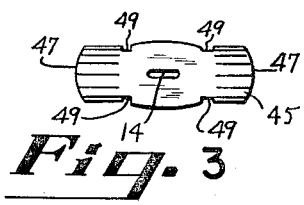
FIG. 4 is a plan view of a blank from which the fastener shown in FIGS. 1 to 3 may be produced.

Referring now again to the drawings and in particular to FIGS. 1 to 3, inclusive, reference number 10 designates a fastener produced in accordance with the instant invention. The fastener may be formed from a single piece or blank of sheet metal stock, as illustrated for instance in FIG. 4, with such blank being subsequently bent into the fastener configuration illustrated in FIGS. 1 to 3 inclusive.

Fastener 10 comprises an elongated head 45 of generally flat configuration with at least the end portions of the head being inwardly bowed as at 48 to provide generally convex under surfaces 48a on the head extending transversely thereof, which act as slides or cams for facilitating rotary movement of the fastener into its holding position on the supporting panel P. The head 45 preferably has a top recess or slot 14 formed therein, which recess provides an aperture which may receive therein a pointed instrument or work tool, such as a screw driver, for turning the fastener into its holding position on the supporting panel.

Depending from head 45 is a split shank portion 16 defining leg portions 16a and 16b. Leg portions 16a and 16b are convexly curved on their exterior surfaces and are disposed in spaced relation, as at 17, with respect to one another throughout their lengths, to give a considerable degree of lateral or transverse resiliency to the shank of the fastener, thereby facilitating insertion into a poor tolerance or tight fitting aperture 20 in the supporting panel.

The end extremities of the head 45 may be of rounded or arcuate configuration, as at 47 (FIG. 3) and head 45 is preferably provided with slots 49 adjacent the juncture of the leg portions 16a, 16b with the head, to facilitate bending of the fastener into its finalized form.

Each of the leg portions 16a, 16b is provided with an upwardly projecting, generally flexible or resilient wing 24, 24a, which wing is preferably curved somewhat inwardly to terminate beneath the head 45 of the fastener in predetermined spaced relationship. It will be noted that the wing 24 is inwardly curved in one direction while wing 24a is inwardly curved in the opposite direction relative to a vertical plane passing through the shank, whereby the fastener is adapted to rotate in a direction opposite to the inward curvature of the wings. Wings 24, 24a are cut away as at 30, to increase the flexibility of such wing portions, and thereby facilitate mounting or twisting of the fastener in the work receiving aperture in the supporting panel.

The fastener is inserted in the aperture 20 in the work panel so that the head engages the confronting surface of the panel, and with the split shank providing for ready insertion into an undersized aperture, and then the fastener is rotated, preferably in a direction opposite to the direction of inward curvature of the wing portions, until the free ends of the wing portions move into the indentation 32 adjacent the periphery of the aperture on the underside of the work panel, with such coaction between the indentations 32 and the free ends of the resilient wing portions aiding in retaining the fastener in attached condition on the supporting panel.

The distance between the free ends of the wing portions 24, 24a and the underside of the inwardly curved head portion 45 is so chosen that the wings will flex or bend somewhat during twisting of the fastener, and with the free ends of the resilient wings being urged into biting relation with the confronting side of the panel, to increase the vibration resistance of the fastener. It will be seen that the head 45 in the mounted condition of the fastener is substantially flush with the confronting surface of the panel and does not project outwardly into interferring relation.

The fastener may be rotated into holding position either by use of the aforementioned screw driver, or by the use of a pair of pliers engaging the head 45, or possibly even by use of a workman's fingers, depending upon the size and resilience of the fastener.

As is illustrated in FIG. 7, the fastener can be utilized to hold together two or more panels of predetermined thickness. In order to disassemble the fastener from a work panel or panels, rotation of the fastener is effected, until the free ends of the wing portions move into the elongated slotted portions 20a of the aperture, whereupon the fastener can be withdrawn from the supporting panel.

From the foregoing discussion and accompanying drawings it will be seen that the invention provides a quickly operable rotary type fastener which may be inexpensively produced from flat stock, such as sheet metal, and which may comprise a generally flattened head portion and a resilient shank portion for facilitating insertion of the fastener into an aperture in a supporting part or panel, and having slide or cam means on the flattened head portion for facilitating rotation of the fastener on the panel, and wherein the fastener may be readily attached to and detached from the supporting panel or part.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A rotary fastener formed of sheet metal and adapted for assembly with an apertured support panel comprising, an elongated head of generally planar configuration in side elevation, said head being bent adjacent each of its opposed ends to form convex surfaces on its underside which extend transversely thereof and which are adapted for coacting engagement with the confronting surface of said support panel to facilitate rotary turning movement of the fastener when applied to said support panel, and extending from said head, said leg portions being spaced laterally from one another throughout their lengths to provide transverse resiliency in said shank, said leg portions having convex exterior surfaces in a generally transverse direction, the transverse dimension of said shank being at least as great as the transverse dimension of said head as measured in the same plane, each of said leg portions including a single outwardly extending resilient wing on the one side thereof commencing adjacent the lower extremity of the respective leg portion and projecting upwardly toward said head, each of said wings being cut away toward its upper end so as to be substantially laterally spaced from its respective leg portion, and the terminal end of each of said wings being disposed in predetermined spaced relation with respect to said head, both of said wings being inwardly curved in the opposite direction relative to a vertical plane passing through said shank, to facilitate rotary movement of said fastener in the opposite direction relative to said curvature upon assembly with said support panel.

2. A fastener device in accordance with claim 1, wherein said head includes notches adjacent the juncture of said leg portions with said head for facilitating bending of said fastener into finalized form.

3. A rotary fastener in accordance with claim 1, wherein the distal ends of said head are of generally arcuate configuration in plan view.

4. A rotary fastener in accordance with claim 1, wherein said head includes an elongated slot adapted to receive a tool, such as a screw driver, for rotating said fastener.

5. In combination, a support panel having an elongated-like aperture therein, and a rotary type fastener formed of a single blank of sheet metal mounted in said aperture in said support panel, said fastener having an elongated generally planar-like head with the head being in engagement with one side of said support panel, said head being bent inwardly to form convex surfaces on its underside extending transversely thereof, to facilitate rotation of the fastener on the panel, a split shank depending downwardly from said head and defining a pair of oppositely disposed leg portions spaced laterally from one another to provide transverse resiliency in said shank, each of said leg portions including a single outwardly extending wing-like member on one side thereof and projecting upwardly toward said head, said shank being received through said aperture with the terminal ends of said wing-like members coacting in holding relation with the underside of the panel to resiliently hold said fastener in predetermined rotated and locked position on said support panel, both of said wing-like members being oppositely curved relative to a vertical plane passing through said shank to facilitate rotary movement of said fastener into and out of locked engagement with said support panel.

6. The combination in accordance with claim 5 including recess portions on the underside of said panel with said terminal ends of said wing-like members being received in said recessed portions, to positively lock the rotary fastener on the support panel.

7. The combination in accordance with claim 5, wherein said elongated aperture in said support panel comprises a circular section with elongated slot portions disposed on diametrically opposite sides of said circular portion in communication therewith, said wing-like members being adapted to be received through said elongated slot portions and then rotated 90° with respect thereto.

8. The combination in accordance with claim 5, wherein said aperture in said support panel is of diamond-shaped configuration, with the wing-like members being adapted to be received along the major axis of said diamond-shaped configuration prior to rotation of the fastener on the panel.

9. The combination in accordance with claim 5, wherein said aperture in said support panel is of oval-shaped configuration with the wing-like members being adapted to be received along the major axis of said oval-aperture prior to rotation of the fastener on the panel.

References Cited

UNITED STATES PATENTS

| | | | |
|---|---|---|---|
| 1,400,409 | 12/1921 | Board | 85—52.2 X |
| 2,077,120 | 4/1937 | Lombard | 85—52.2 X |
| 2,599,207 | 6/1952 | Spahr et al. | 85—52.2 X |

REINALDO P. MACHADO, *Primary Examiner.*

HARRISON R. MOSELEY, *Examiner.*

A. I. BREIER, *Assistant Examiner.*

UNITED STATES PATENT OFFICE
CERTIFICATE OF CORRECTION

Patent No. 3,332,712                                    July 25, 1967

Robert J. Holton

It is certified that error appears in the above identified patent and that said Letters Patent are hereby corrected as shown below:

Column 3, lines 47 and 48, cancel ", and extending from said head," and insert -- , a split shank depending downwardly centrally from said head and defining a pair of oppositely disposed leg portions, each of said leg portions being integral with and extending from each side of said head, --.

Signed and sealed this 9th day of December 1969.

(SEAL)
Attest:

Edward M. Fletcher, Jr.                          WILLIAM E. SCHUYLER, JR.

Attesting Officer                                        Commissioner of Patents